3,272,806
4-(3,4-DIMETHOXYBENZYLIDENEAMINO)
6,7-DIMETHOXYQUINOLINE
Alexander Winterstein, Norwich, N.Y., assignor to The
 Norwich Pharmacal Company, Norwich, N.Y., a cor-
 poration of New York
No Drawing. Filed Aug. 25, 1964, Ser. No. 392,046
1 Claim. (Cl. 260—240)

This invention relates to the novel chemical compound 4-(3,4-dimethoxybenzylideneamino) - 6,7 - dimethoxyquinoline of the formula:

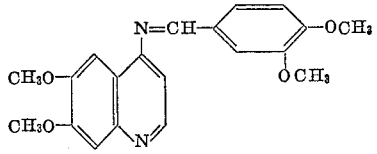

which is distinguished by a high order of hypotensive and antihypertensive activity upon intravenous or peroral administration to animals in far less than host toxic amount. When administered intravenously to anesthetized dogs in a dose of from 1–25 mg./kg., blood pressure is reduced over a period of from 5–7 hours. Administered perorally to unanesthetized renal hypertensive dogs in doses ranging from 10–40 mg./kg., a marked antihypertensive effect is elicited.

The novel compound of this invention may be readily prepared using readily available starting materials. In accordance wtih the now-preferred method of making it, 4-amino-6,7-dimethoxyquinoline and veratraldehyde are brought together in the presence of a solvent such as toluene and a catalyst such as piperidine; the mixture is heated until the reaction is complete, whereupon the desired end product 4-(3,4-dimethoxybenzylideneamino)-6,7-dimethoxyquinoline is secured by cooling and filtering.

For convenient administration the compound of this invention is readily formulated into commonly employed dosage forms such as capsules, elixirs, suspensions, tablets and the like, using excipients and adjuvants common to the apothecary art and with which there is no incompatibility.

In order that this invention may be readily available to and understood by those skilled in the art the following illustrative example of its preparation is supplied:

*4-(3,4-dimethoxybenzylideneamino)-6,7-dimethoxy-
 quinoline (U–1085)*

A mixture of 4-amino-6,7-dimethoxyquinoline (80 g., 0.392 mole), toluene (1.5 l.), veratraldehyde (66 g., 0.398 mole), and piperidine (35 ml.) is refluxed for 18.5 hours while collecting the water formed. The hot toluene is decanted from any insoluble solid. After cooling, filtering, and washing with petroleum ether 95 g. of title product (M.P. 155–157° C.) is obtained in a yield of 68.7%. This material may be recrystallized from ethanol (1700 ml.) to yield 70 g., M.P. 165–167° C.

Analysis.—Calcd.: C, 68.17%; H, 5.72%; N, 7.95%. Found: C, 68.19%; H, 5.66%; N, 7.94%.

What is claimed is:
The compound 4-(3,4-dimethoxybenzylideneamino)-6,7-dimethoxyquinoline.

No references cited.

JOHN D. RANDOLPH, *Primary Examiner.*